United States Patent
Utgikar et al.

(10) Patent No.: US 9,432,286 B2
(45) Date of Patent: Aug. 30, 2016

(54) METHOD AND SYSTEM FOR HITLESS UPGRADE OF CHASSIS IN VIRTUALIZED ENVIRONMENT

(71) Applicant: Telefonaktiebolaget L M Ericsson (publ), Stockholm (SE)

(72) Inventors: Anant P Utgikar, Bangalore (IN); Ashish Anand, Bangalore (IN); Nitin Katiyar, Bangalore (IN); Keshav Gupta, Bangalore (IN); Paramanand Singh, Bangalore (IN); Ashwani Kumar Mehra, Bangalore (IN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 280 days.

(21) Appl. No.: 14/227,315

(22) Filed: Mar. 27, 2014

(65) Prior Publication Data

US 2015/0281054 A1    Oct. 1, 2015

(51) Int. Cl.
*H04L 12/713* (2013.01)
*H04L 12/771* (2013.01)
*H04L 12/24* (2006.01)
*H04L 12/931* (2013.01)

(52) U.S. Cl.
CPC ........... *H04L 45/563* (2013.01); *H04L 41/082* (2013.01); *H04L 45/586* (2013.01); *H04L 49/351* (2013.01); *H04L 49/70* (2013.01)

(58) Field of Classification Search
CPC .............................. H04L 45/586; H04L 49/70
See application file for complete search history.

(56) References Cited

U.S. PATENT DOCUMENTS

| | | | | |
|---|---|---|---|---|
| 6,978,309 B1 * | 12/2005 | Dorbolo | ............. | H04L 12/5601 370/395.31 |
| 8,676,949 B2 * | 3/2014 | Vilke | ........................ | G06F 9/54 709/217 |
| 8,949,320 B2 * | 2/2015 | Luxenberg | .......... | H04L 67/2842 709/203 |
| 9,021,459 B1 * | 4/2015 | Qu | ............................ | G06F 8/65 710/33 |
| 9,185,030 B2 * | 11/2015 | Deshpande | ............. | H04L 45/60 |

(Continued)

FOREIGN PATENT DOCUMENTS

WO    2012038884 A1    3/2012

OTHER PUBLICATIONS

Pedro S. Pisa et al., "VNEXT: Virtual NEtwork management for Xen-based Testbeds," Nov. 28, 2011, pp. 41-45, 2011 International Conference on the Network of the Future (NOF), IEEE.

*Primary Examiner* — Lashonda Jacobs
(74) *Attorney, Agent, or Firm* — Nicholson De Vos Webster & Elliott, LLP

(57) ABSTRACT

Exemplary methods for upgrading route processor virtual machines (RP VMs) and line card virtual machines (LC VMs) include upgrading a second RP VM serving as a standby RPVM with a new RP VM image. The methods further include spawning, using a new LC VM image, a second set of LC VMs to serve as standby LC VMs. The methods also include performing incubation of standby VMs, by configuring a switch to forward data traffic to both the first and second set of LC VMs, thereby allowing system states of the standby VMs to be auto-populated by the data traffic. The methods further include, after the incubation has completed, swapping roles of VMs at the virtual router, such that data traffic are exchanged only between the switch and the upgraded VMs.

24 Claims, 7 Drawing Sheets

(56) References Cited

U.S. PATENT DOCUMENTS

| | | | |
|---|---|---|---|
| 2009/0327392 A1* | 12/2009 | Tripathi | H04L 49/70 709/201 |
| 2010/0287548 A1* | 11/2010 | Zhou | G06F 9/4856 718/1 |
| 2011/0154333 A1* | 6/2011 | Miyamoto | G06F 9/45533 718/1 |
| 2011/0231833 A1* | 9/2011 | Narayanan | G06F 8/67 717/171 |
| 2013/0114613 A1* | 5/2013 | Deshpande | H04L 45/60 370/401 |
| 2013/0185746 A1* | 7/2013 | Yang | H04N 21/25841 725/25 |
| 2014/0365196 A1* | 12/2014 | Melander | G06F 17/5009 703/13 |
| 2015/0172305 A1* | 6/2015 | Dixon | G06F 21/53 726/23 |
| 2015/0350214 A1* | 12/2015 | Gilpin | H04L 63/10 726/5 |

* cited by examiner

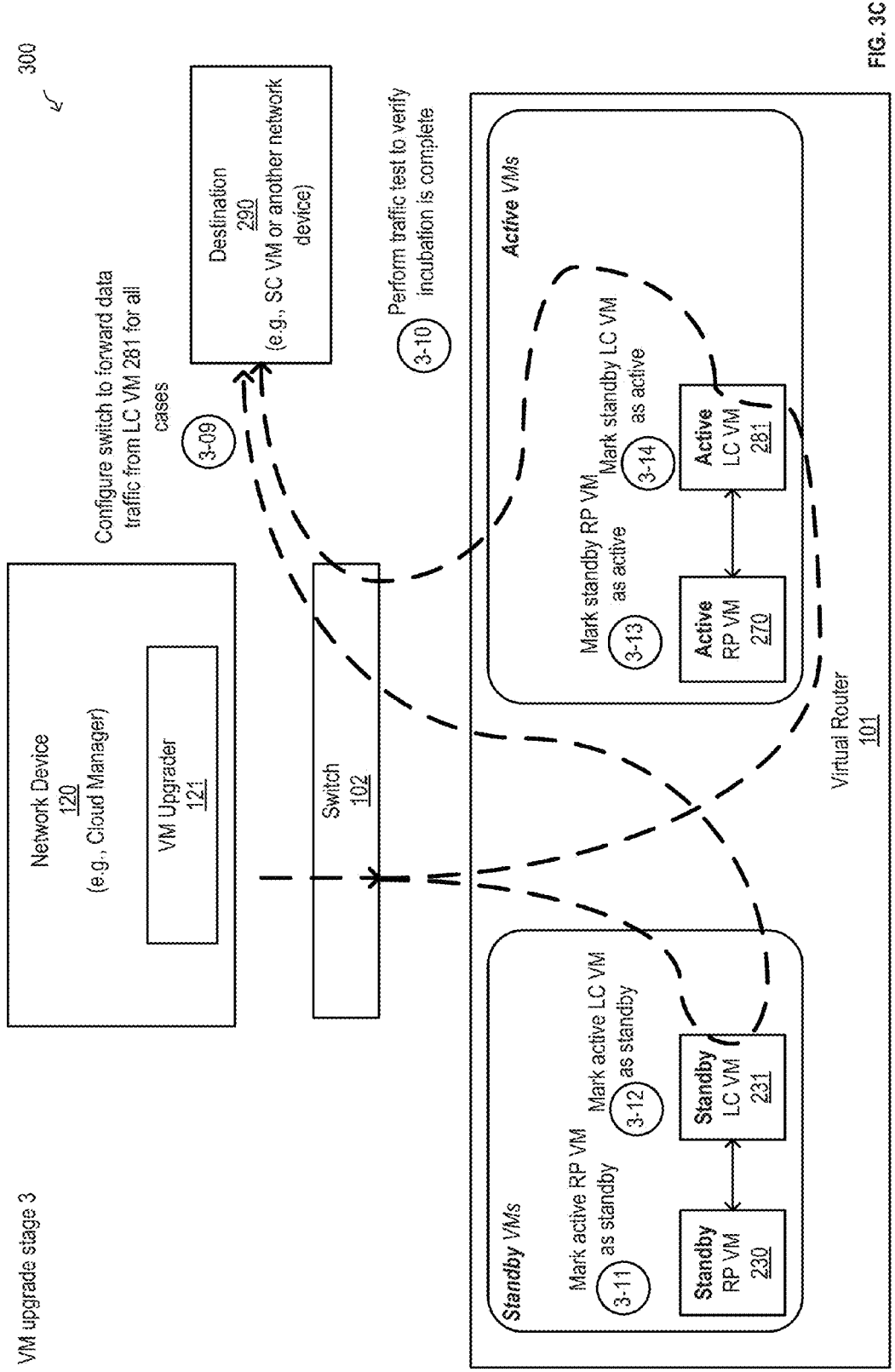

METHOD AND SYSTEM FOR HITLESS UPGRADE OF CHASSIS IN VIRTUALIZED ENVIRONMENT

FIELD

Embodiments of the invention relate to the field of packet network; and more specifically, to a method and apparatus for performing hitless upgrade of chassis in a virtualized environment.

BACKGROUND

Telecommunication and data services are becoming increasingly sensitive to interruption in service. Service providers, for example, strive for minimum network service disruption. Conventional mechanisms for performing line card upgrade on physical routers, however, results in traffic disruption for a long duration (typically for a few minutes). For example, a conventional method for upgrading a line card on a physical router may include downloading a new image on the route processor (RP) currently serving as a standby supervisor for the physical router (herein referred to simply as the standby RP). The configuration and operational state is then copied from the RP currently serving as the active supervisor for the physical router (herein referred to simply as the active RP) to the standby RP. The RPs are then configured to swap roles (i.e., the active RP becomes the standby RP, and the standby RP becomes the active RP). Next, the new image is downloaded onto the new standby RP. Finally, the RP roles are swapped back to their original configuration.

Under a conventional upgrade process, traffic loss is prevented by redirecting traffic to a secondary physical router while the upgrade is being performed. For example, the physical routers can be operating in Inter-chassis redundancy (ICR) mode. This requires, however, duplicate data ports to source incoming traffic and redundant hardware of the same type (for each chassis to be upgraded), which makes it an expensive solution.

SUMMARY

Exemplary methods for performing upgrade of route processor virtual machines (RP VMs) and line card virtual machines (LC VMs) located at a virtual router without disruption to data traffic include a first network device that is communicatively coupled to a switch and the virtual router in a network, wherein the switch sends data traffic received from the virtual router to the network, and sends data traffic received from the network to the virtual router. According to one embodiment, the exemplary methods, performed by the first network device, include upgrading a second RP VM at the virtual router with a new RP VM image, wherein the second RP VM is serving as a current standby RP VM, and wherein a first RP VM located at the virtual router is serving as a current active RP VM.

In one embodiment, the exemplary methods further include spawning, using a new LC VM image, a second set of one or more LC VMs to serve as current standby LC VMs at the virtual router, wherein each of the one or more LC VMs of the second set of LC VMs corresponds to an upgraded version of a LC VM of a first set of one or more LC VMs serving as current active LC VMs at the virtual router.

In one aspect of the invention, the exemplary methods further include performing incubation of standby VMs at the virtual router, by configuring the switch to forward data traffic to both the first and second set of one or more LC VMs, thereby allowing system states of the standby VMs to be auto-populated by the data traffic. In one embodiment, after the incubation has completed, the exemplary methods include swapping roles of virtual machines (VMs) at the virtual router, such that data traffic are exchanged only between the switch and the upgraded VMs at the virtual router.

BRIEF DESCRIPTION OF THE DRAWINGS

Embodiments of the invention are illustrated by way of example and not limitation in the figures of the accompanying drawings in which like references indicate similar elements.

FIG. 3C is a block diagram illustrating image upgrade operations according to one embodiment.

DESCRIPTION OF EMBODIMENTS

Figure 1:
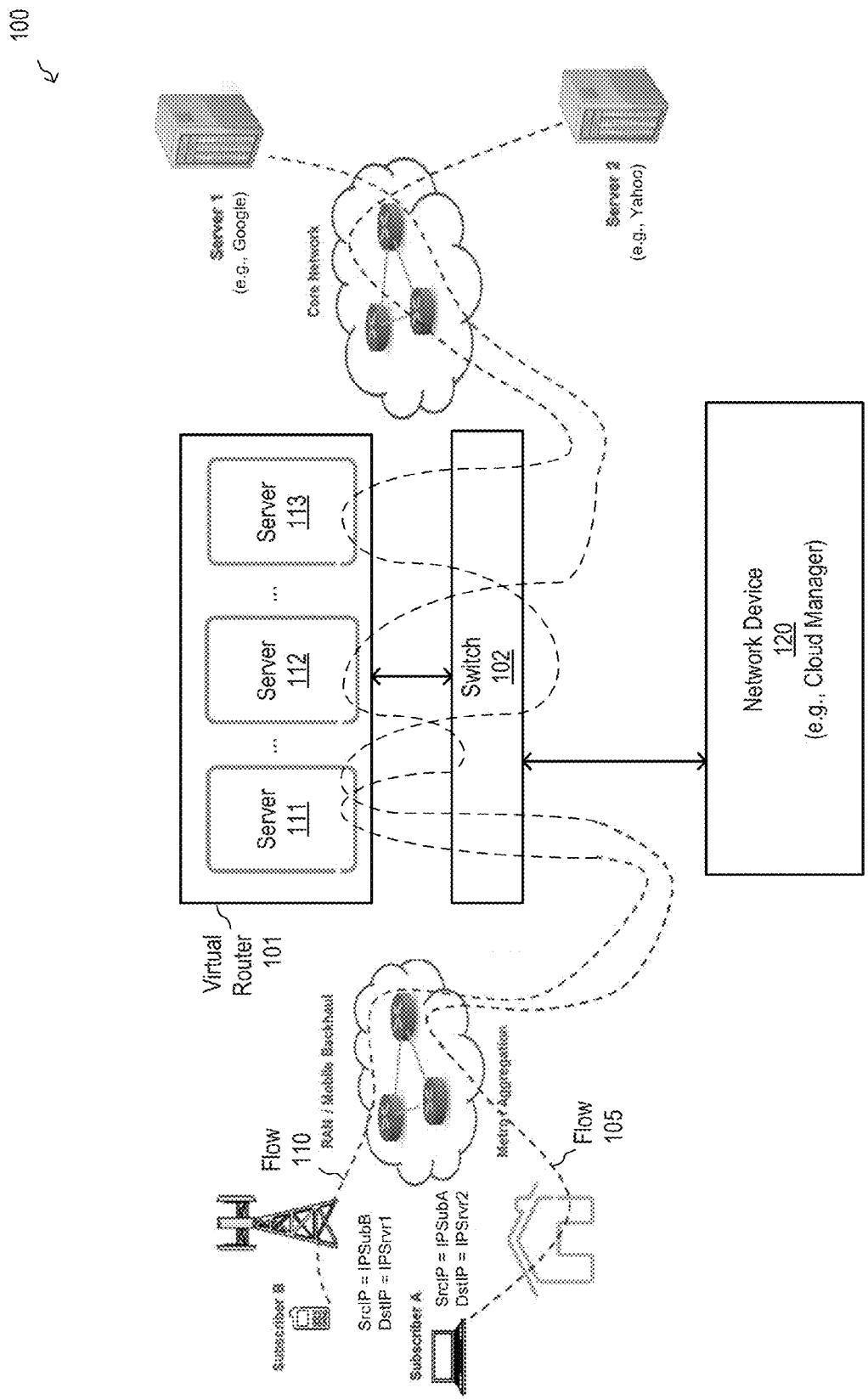
FIG. 1 is a block diagram illustrating service chaining in a virtual router according to one embodiment.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device (e.g., a router, switch, bridge) is a piece of networking equipment, including hardware and software, which communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer-to-peer (P2P) service, and may include, for example, public webpages (e.g., free content, store fronts, search services), private webpages (e.g., username/pas sword accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations).

Network devices are commonly separated into a control plane and a data plane (sometimes referred to as a forwarding plane or a media plane). In the case that the network device is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP), etc.) that communicate with other network devices to exchange routes and select those routes based on one or more routing metrics.

Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main RIB based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols.

Typically, a network device includes a set of one or more line cards, a set of one or more control cards, and optionally a set of one or more service cards (sometimes referred to as resource cards). These cards are coupled together through one or more interconnect mechanisms (e.g., a first full mesh coupling the line cards and a second full mesh coupling all of the cards). The set of line cards make up the data plane, while the set of control cards provide the control plane and exchange packets with external network devices through the line cards. The set of service cards can provide specialized processing (e.g., Layer 4 to Layer 7 services (e.g., firewall, Internet Protocol Security (IPsec), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms.

The line cards, control cards, and/or service cards may be implemented as hardware cards. Under the network function virtualization (NFV) paradigm, these cards can be implemented as software entities (herein referred to as virtual machines (VMs)). As used herein, a VM is a software-based emulation of a "machine" (e.g., physical line card, physical control card, physical service card, etc.) VMs perform tasks that are similar to their hardware counterpart.

A network interface may be physical or virtual; and an interface address is an IP address assigned to a network interface, be it a physical network interface or virtual network interface. A physical network interface is hardware in a network device through which a network connection is made (e.g., wirelessly through a wireless network interface controller (WNIC) or through plugging in a cable to a port connected to a network interface controller (NIC)). Typically, a network device has multiple physical network interfaces. A virtual network interface may be associated with a physical network interface, with another virtual interface, or stand on its own (e.g., a loopback interface, a point to point protocol interface). A network interface (physical or virtual) may be numbered (a network interface with an IP address) or unnumbered a network interface without an IP address). A loopback interface (and its loopback address) is a specific type of virtual network interface (and IP address) of a node (physical or virtual) often used for management purposes; where such an IP address is referred to as the nodal loopback address. The IP address(es) assigned to the network interface(s) of a network device, are referred to as IP addresses of that network device; at a more granular level, the IP address(es) assigned to network interface(s) assigned to a node implemented on a network device, can be referred to as IP addresses of that node.

As set forth above, conventional methods for upgrading a line card in a physical router requires redundant hardware in order to prevent traffic loss while the upgrade is being performed, which makes it an expensive solution. The present invention overcomes this limitation. Under the NFV paradigm, routers can be designed as a pure software solution running on Commercial Off the Shelf (COTS) servers. The software router solution performs networking functions as a collection of multiple VM instances of different types, such as route processor virtual machine (RP VM), line card virtual machine (LC VM), service card virtual machine (SC VM), application virtual machines (APP VM), etc. The supervisor/controller card is implemented as part of the RP-VM. Each line card/port cluster can be implemented as part of one or more LC-VMs. Also, the telecommunication applications such as Evolved packet gateway (EPG), service-aware support node (SASN), Evolved Packet Data Gateway (EPDG), Broadband Network Gateway (BNG), Broadband Remote Access Server (BRAS), Gateway GPRS Support Node (GGSN), Evolved Packet Core (EPC), Deep Packet Inspection (DPI), Carrier Grade Network Address Translation (CGNAT), etc., can be implemented as part of one or more APP VMs. The applications running on the APP VMs are accessible via the SC VM. These virtual machines need not be co-located on same server. However, network connectivity is required between servers hosting these VMs.

In a typical network configuration, traffic will arrive onto the LC-VMs from a switch and exit the same way. By way of illustration and not limitation, the switch receives data traffic from the network. The data traffic is then sent by the switch to one or more LC VMs on the virtual router. In one embodiment, the data traffic is then sent by the LC VM(s) back to the switch, which in turn, sends it to a destination (e.g., a service card VM or another network device). Throughout the description, data traffic is described as traversing from an LC VM to switch 102. It shall be appreciated that data traffic can traverse one or more other VMs within virtual router 101 prior to exiting to switch 102. For example, data traffic may traverse between multiple LC VMs before exiting to switch 102.

Under the NFV paradigm, it is possible to spawn additional spare entities (i.e., VMs) before the original entities are taken out of service during an image release upgrade. This allows image upgrade to be performed without requiring additional hardware. Due to the modular nature of COTS servers, it is possible to scale the capacity as per traffic load. On COTS server hardware, it is possible to spawn additional (standby) line card VMs while the current routing system is still functional, without requiring additional identical hardware.

Three upgrade scenarios can arise: (a) upgrading the virtual router with a RP-VM image only, (b) upgrading the virtual router with an Application VM image only, and (c) upgrading the virtual router with a RP-VM and LC-VM images simultaneously. Note that scenario (a) (i.e., upgrading the RP-VM image alone) can be handled by conventional In-Service-Software-Upgrade (ISSU) without traffic disruption. Scenario (b) (i.e., upgrading Application VM image) can be achieved in its own domain, independent of the RP and LC upgrade. This invention applies to scenario (c) (i.e., upgrading the RP VM and LC VM images simultaneously).

As used herein, a "virtual router" can be a router hosting multiple network functions/applications/services (such as L2/L3 P/PE, Subscriber Management, Carrier Grade Network Address Translation (CGNAT), Deep Packet Inspection (DPI), etc.). A "virtual router" can also be a simple switch which does a layer 2 bridging/switching. Further, a "virtual router" can be a network of devices where a certain set of nodes perform functions of a control plane, whereas others perform functions of the data plane (e.g. packet forwarding and processing functions). Thus, a virtual router can be realized by a single node in the network, or by a set of nodes in the network (e.g. in a Software Defined Network (SDN) environment).

The mechanisms of the present invention for upgrading VM images have many advantages. For example, by using the present mechanisms, line card upgrade can be performed without a disruption to the data traffic flow and without the need for additional, expensive, redundant hardware. Further, the present image upgrade mechanisms provide image consistency between the RP VM and LC VM. Moreover, the upgrade process, as described herein, is completely transparent to the SC VM, thus, allowing traffic flow forwarding to be seamless for any service application.

Various embodiments of the present invention will now be illustrated through the description of the following figures, in which like references indicate similar elements.

FIG. 1 is a block diagram illustrating a typical service chaining in a virtual router of network 100, according to one embodiment. In the illustrated embodiment, virtual router 101 is communicatively coupled to switch 102 (which can be, for example, a top of rack switch). Switch 102 is communicative coupled to network device 120, which in one embodiment, is operating as a cloud manager. As illustrated, subscriber A (e.g., a laptop user) is connected (i.e., has access) to server 2 (which may be hosting a web service such as Yahoo®) via traffic flow 105. Flow 105 includes the data traffic traversing through virtual router 101 (e.g., through one or more servers 111-113 of virtual router 101) via switch 102. FIG. 1 also illustrates subscriber B (e.g., a mobile user) is connected (i.e., has access) to server 1 (which may be hosting a web service such as Google®) via traffic flow 110. Flow 110 also includes the data traffic traversing through virtual router 101. As the data traffic associated with subscriber A and B traverse virtual router 101, it may be processed by virtual router 101 before it exits the virtual router and travels toward its destination. One having ordinary skill in the art would recognize that traffic flows 105 and 110 need not, however, be processed by virtual router 101.

A flow, as used herein, is a network traffic that can be identified by a set of attributes. For example, attributes which may be used to identify a flow include the 5 tuple (source/destination IP address, Protocol, and source/destination TCP/UDP Port), source/destination Media Access Control (MAC) address, or any other set of bits on the packets (e.g. the Priority Code Point (PCP) bits, Virtual Local Access Network (VLAN) IDs, etc.). For example, over a certain link (e.g., from node A to node B) in a network, packets passing through with a specific source IP address (e.g., IP1) is a flow identified by the source IP address over that link with the attributes (IP1, A, B). As another example, in an access network, traffic originated from a subscriber can also be considered as a flow where one can identify that flow as the traffic passing through the UNI/NNI/ANI port of the Residential Gateway (RG). Such subscriber flows in access and edge networks can also be identified by the subscriber IP addresses. Further, upstream/downstream subscriber flow (i.e., the flow from the subscriber/network side to the network side/subscriber) will have the IP address of the subscriber as the source/destination IP address, respectively. Flow ID is an ID or tag used to uniquely identify a flow. For example, the set of attributes used to identify a flow may be mapped to natural numbers to construct flow IDs.

By way of example, flow 105 may be identified by a set of attributes consisting of (source IP address=IPSubA, destination IP address=IPSrv2), where IPSubA is the IP address of subscriber A and IPSrv2 is the IP address of server 2. Flow 110 may be identified by a set of attributes consisting of (source IP address=IPSubB, destination IP address=IPSrv1), where IPSubB is the IP address of subscriber B and IPSrv1 is the IP address of server 1.

Referring still to FIG. 1. In one embodiment, network device 120 is configured to manage and coordinate switch 102 and virtual router 101. On a conventional physical routing/switch chassis, the active RP at the chassis is responsible for performing the software upgrade. Under the NFV paradigm, according to various embodiments of the present invention, network device 120 is configured to manage and coordinate the mechanisms for upgrading VM images at virtual router 101. The mechanisms for upgrading VM images shall become apparent through the description of other figures below.

Figure 2:
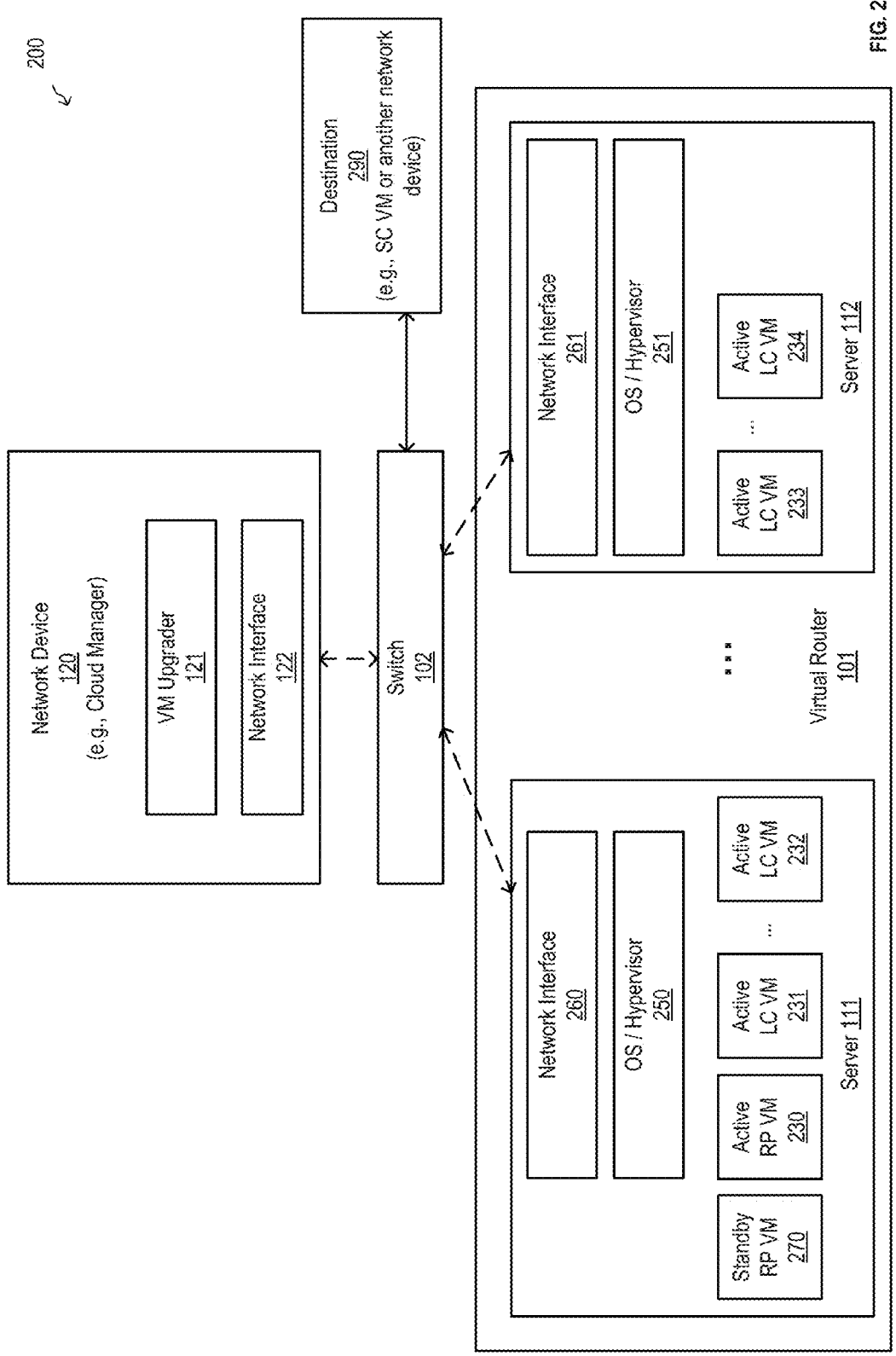
FIG. 2 is a block diagram illustrating a network configuration according to one embodiment.

FIG. 2 is a block diagram illustrating network 200 according to one embodiment. Network 200 is similar to network 100. Certain details of network 200 have been omitted, however, in order to avoid obscuring the invention. Certain details of network device 120 and virtual router 101, however, have been added in order to clarify the invention.

According to one embodiment, virtual router 101 includes server 111 and server 112, which can be implemented as COTS servers. In the illustrated embodiment, servers 111-112 include network interfaces 260-261, respectively, for exchanging data/network traffic with switch 102, and communicating with network device 120. According to one aspect of the invention, servers 111-112 further include operating system (OS)/hypervisor 250-251, respectively. An OS is a collection of software that manages hardware resources (e.g., allocation and de-allocation of hardware resources for software programs, such as VMs). A hypervisor (also commonly known as a virtual machine monitor (VMM)) is configured to create and manage VMs. A hypervisor can be implemented as software, firmware, hardware, or any combination thereof.

Virtual router 101 includes multiple instances of VMs. For example, virtual router 101 includes active and standby RP VMs 230 and 270, respectively. A RP VM is responsible for configuring, controlling, and managing various VMs running on the virtual router. Throughout the description, VMs are referred to as "active" or "standby". As used herein, an "active" VM is a VM that is configured to perform its dedicated tasks. A "standby" VM is a VM that is configured to be a backup for its respective "active" VM. A "standby" VM does not perform its dedicated tasks until it is switched to the "active" mode.

In the illustrated embodiment, virtual router 101 includes active LC VMs 231-234. One having ordinary skill in the art would recognize that virtual router 101 can have more or less active LC VMs running on more or less servers. For example, virtual router 101 can have just one active LC VM running on server 111. Alternatively, virtual router 101 can have additional LC VMs running on a third, fourth, etc., server (not shown). In some embodiments, virtual router 101 can be configured such that it does not have any active LC VM at all. Accordingly, it shall be understood that virtual router 101 can be implemented as one or more servers. In the illustrated embodiment, two servers are shown by way of example. The VMs shown in servers 111-112 are illustrated by way of example, and not limitation. One having ordinary skill in the art would recognize that the VMs can be executed on different servers as shown. For example, standby RP VM 2270 and active RP VM 230 do not have to be on the same server.

In one aspect of the invention, network device 120 includes network interface 122 to allow network device 120 to communicate with switch 102 and virtual router 101. Network device 120 further includes VM upgrader 121 responsible for configuring and managing switch 102 and virtual router 101 in order to upgrade VM images at virtual router 101 without disruption to the traffic flow. VM upgrader 121 can be implemented as software, firmware, hardware, or any combination thereof. In one embodiment, VM upgrader 121 configures switch 102 and virtual router 101 using a protocol, for example, but not limited to, OpenFlow protocol. OpenFlow protocol is a communication protocol well known in the art, and thus, for the sake of brevity, it will not be discussed here.

FIG. 2 illustrates that switch 102 is communicatively coupled to destination 290. Here, destination 290 can be any destination, such as a SC VM. Destination 290 can also be any network device in any network. Thus, for example, destination 290 can be an abstract of the core network, and/or server 1 and/or server 2 of FIG. 1.

FIGS. 3A-3D are block diagrams illustrating the operations for performing VM image upgrade in network 300, according to one embodiment. Network 300 is similar to network 200. Certain details of network 300 have been omitted, however, in order to avoid obscuring the invention. FIGS. 3A-3D illustrate the upgrade operations of VM upgrade stages 1-4, respectively. The upgrade operations are grouped into these stages for illustrative purposes, and not intended to be a limitation of the present invention. One having ordinary skill in the art would recognize that the upgrade operations can be grouped into stages other those illustrated in FIGS. 3A-3D. In one embodiment, the upgrade operations are driven (i.e., initiated/managed) by VM upgrader 121.

Figure 3A:
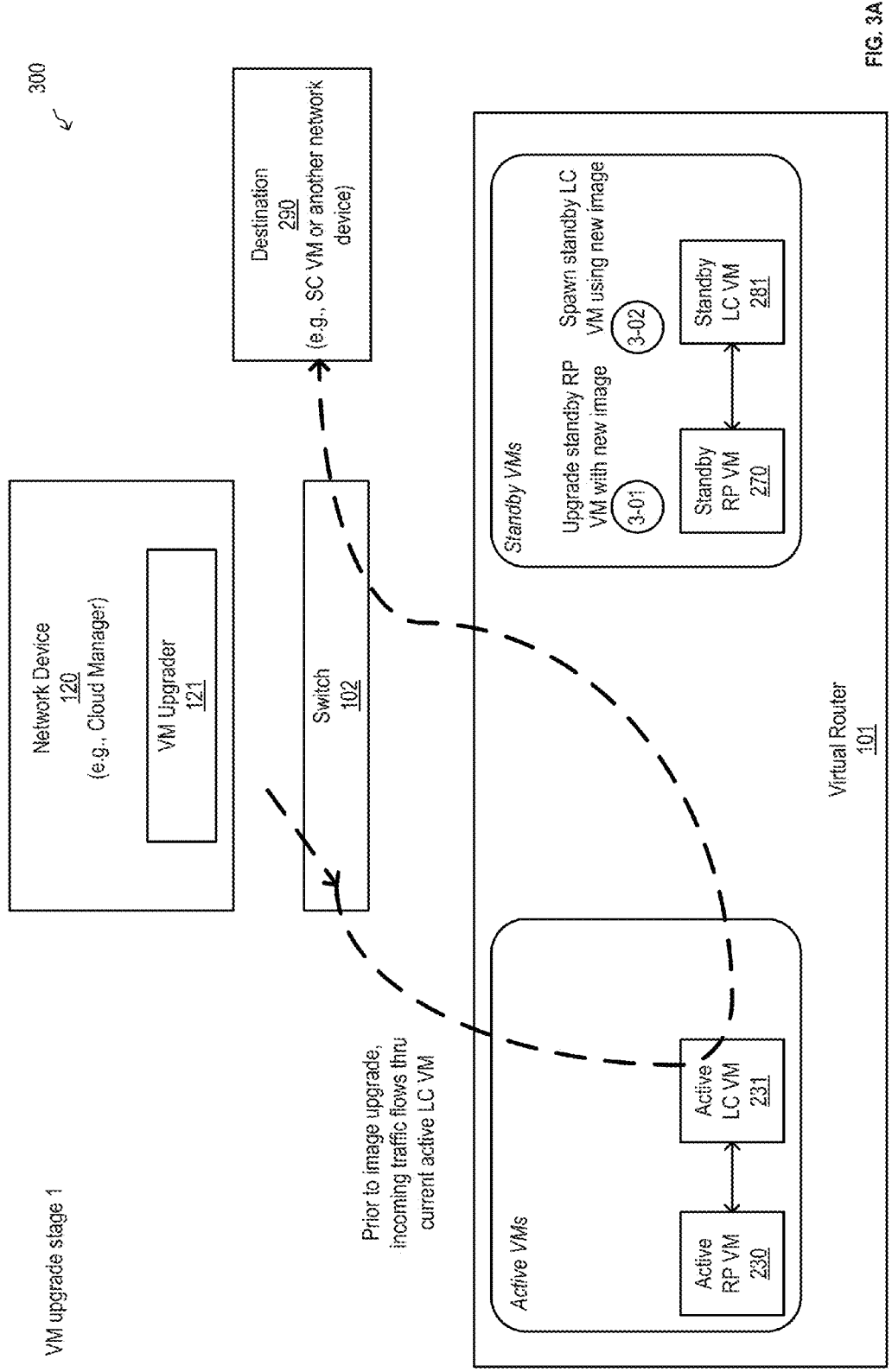
FIG. 3A is a block diagram illustrating image upgrade operations according to one embodiment.

Referring now to FIG. 3A, which assumes that virtual router 101 only has one active LC VM (shown as active LC VM 231). FIG. 3A further assumes that virtual router 101 includes active and standby RP VMs 230 and 270, respectively. Prior to the image upgrade, network traffic flows from switch 102 to active LC VM 231. From LC VM 231, data traffic flows back to switch 102. Switch 102 then forwards the data traffic to destination 290, which can be a SC VM, another network device, etc.

At operation 3-01, VM upgrader 121 upgrades standby RP VM 270 with a new RP VM image. In one embodiment, VM upgrader 121 uses a new LC VM image to spawn a standby LC VM for each active LC VM that currently exists at the virtual router. In this example, at operation 3-02, VM upgrader 121 uses the new LC VM image to spawn standby LC VM 281 which corresponds to an upgraded version of active LC VM 231. As used herein, spawning refers to the loading and execution of a software process (in this context, a VM). According to one embodiment, at this point stage 1 of the upgrade process is completed.

Figure 3B:
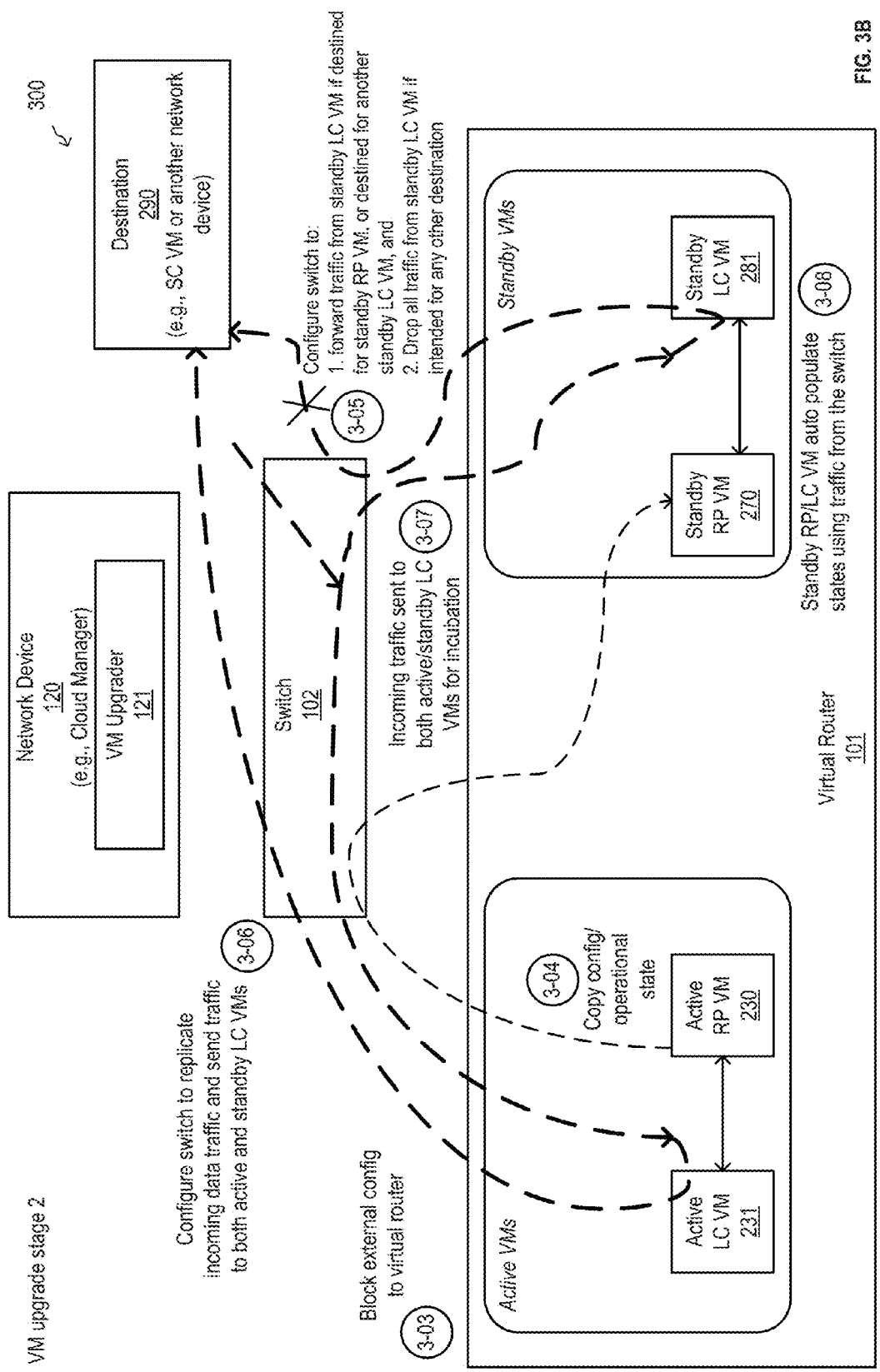
FIG. 3B is a block diagram illustrating image upgrade operations according to one embodiment.

Referring now to FIG. 3B, at operation 3-03, VM upgrader 121 blocks all external configurations to virtual router 101. As used herein, external configurations are configurations other than those required as part of the upgrade process. External configurations can originate from a user/administrator, and/or from a service application at an APP VM. By blocking the external configurations, VM upgrader 121 prevents the VMs from changing operational states during the upgrade process. At operation 3-04, VM upgrader 121 copies the system states of active RP VM 230 to standby RP VM 270. As used herein, system states refer to the configuration/static states and operational/dynamic states. In one embodiment, as part of operation 3-04, the system states that are copied include the configuration, or operational states, or any combination thereof. In one embodiment, the system states of active and standby LC VMs 231 and 281, respectively, are already in sync. In such an embodiment, the system states of active LC VM 231 do not have to be copied to standby LC VM 281. In an embodiment where the active and standby LC VMs are not in sync, VM upgrader 121 copies the system states of active LC VM 231 to standby LC VM 281. The system states that are copied from active LC VM 231 to standby LC VM 281 include configuration states, or operational states, or any combination thereof.

At operation 3-05, VM upgrader 121 configures switch 102 to forward data traffic received from new standby LC VM 181 if the received data traffic is destined for a standby RP VM (e.g., standby RP VM 270), or if the received data traffic is destined for another standby LC VM (not shown). As part of operation 3-05, VM upgrader 121 also configures switch 102 to drop all data traffic received from new standby LC VM 281 if the data traffic is intended for any destination other than a standby RP VM or a standby LC VM. For example, data traffic intended for destination 290 are dropped.

Although traffic has been described as being dropped at switch 102 (either at the ingress or egress point of the switch), it shall be appreciated that the traffic can dropped at various other nodes in the network. For example, as part of 3-05, VM upgrader 121 can configure virtual router 101 to drop the data traffic at the server hosting new standby LC VM 181 if the data traffic is not destined for another standby LC VM, and not destined for a standby RP VM. For example, if server 111 is hosting LC VM 181, VM upgrader 121 can configure server 111 to drop all traffic from LC VM 181 if the data traffic is intended for any destination other than a standby RP VM or a standby LC VM. In an alternate embodiment, VM upgrader 121 can configure virtual router 101 to drop the data traffic at LC VM 181 if the data traffic is not destined for another standby LC VM, and not destined for a standby RP VM (i.e., if the data traffic is intended for any destination other than a standby RP VM or a standby LC VM.)

At operation 3-06, VM upgrader 121 configures switch 102 to replicate the data traffic and send the data traffic to both active LC VM 231 and standby LC VM 281 for incubating standby RP VM 270 and standby LC VM 281. As used herein, incubating refers to the forwarding of live data traffic to standby RP VM 270 and/or standby LC VM 281 until their configuration (e.g., static) states and operational (e.g., dynamic) states stabilize to the same state as active RP VM 230 and active LC VM 231, respectively.

According to one embodiment, VM upgrader 121 configures switch 102 to replicate data by adding forwarding entries of multicast (at stage 2). In yet another embodiment, VM upgrader 121 configures entries for multicast on switch 102 with certain timeout duration. These forwarding entries are then removed at stage 3. This could be done either using special multicast address—or more than one unicast addresses—to forward traffic to. In yet another embodiment, VM upgrader 121 configures multicast entries on switch 102 with certain timeout duration.

In one embodiment, data traffic to be replicated for incubation purposes include incoming data traffic. As used herein, incoming data traffic refers to data traffic received by switch 102 from the network to be sent to virtual router 101. At operation 3-07, switch 102 sends the data traffic to both active LC VM 231 and standby LC VM 281 for incubation purposes. As part of operation 3-8, standby RP VM 270 and standby LC VM 281 use the data traffic from switch 102 to auto-populate their system states (including configuration states, operational states, or any combination thereof). According to one embodiment, at this point stage 2 of the VM image upgrade process is completed.

Referring now to FIG. 3C, at operation 3-09, VM upgrader 121 configures switch 102 to forward data traffic received from LC VM 281 for all cases (e.g., even if the data traffic is not destined for a standby LC VM or standby RP VM). For example, VM upgrader 121 configures switch 102 to stop dropping data traffic, even if it is intended for destination 290.

At operation 3-10, VM upgrader 121 performs a traffic test to verify that the incubation is completed. According to one embodiment, the incubation process is determined to be completed if the incubation process has been performed for a predetermined duration of time (e.g., 5-10 minutes). In another embodiment, the incubation process is determined to be completed after the incubation process has been performed for a duration of time equal to (N*Total packet turnaround time), where:

$N$=some integer (e.g., 1,3,5, etc.), and

Total packet turnaround time=time taken for a packet to travel from switch 102 to virtual router 101+packet processing at virtual router 101+time for the packet to travel from virtual router 101 back to switch 102.

In another embodiment, the incubation process is determined to be completed after switch 102 has sent a predetermined number of packets to both active and standby LC VMs. In this embodiment, if switch 102 has sent X number of packets to the active LC VM, then the incubation process is determined to be completed if Y packets have also been sent to the standby LC VM corresponding to the active LC VM. In such an embodiment, Y can be the same number as X, or Y can be different from X within a predetermined margin of error. For example, X can be configured to be 100 packets, and the margin of error can be configured to be 10%. In this example, the incubation process is completed if 100 packets have been sent to the active LC VM and at least 90 packets have been sent to the corresponding standby LC VM. In this embodiment, switch 102 includes packet counters for counting the number of packets sent to the LC VMs, and such counters are accessible by network device 120.

In yet another embodiment, the incubation process is determined to be completed on a per FIB entry basis. In such an embodiment, each of the FIB table is accessible by switch 102. When switch 102 sends (and receives) traffic to (from) the LC VMs, it marks the FIB entry for which traffic has been sent to (received from) LC VM. The outcome of standby LC VM 281 forwarding action should be identical to that of active LC VM 231. Thus, if active LC-VM 231 drops a packet, standby LC VM 281 should do the same. If active LC-VM 231 forwards a packet, the packet should arrive at switch 102 just like the packet from standby LC-VM 281. In such an embodiment, the FIB table of each of the LC-VMs is accessible to the switch 102. As traffic passes through switch 102 to (from) the LC VMs, switch 102 marks the FIB entry for which traffic has been sent to (received from) the corresponding LC VM. Switch 102 could mark a certain field in packet header to identify particular packet upon reception. In yet another embodiment, switch 102 or VM upgrader 121 could originate test traffic (instead of using the live traffic). This is sent to both active and standby LC-VMs, which should perform identical processing. In yet another embodiment, switch 102 could compare the number of entries in the FIB table of both active and standby LC-VMs. Further, a checksum could be computed on certain fields of the FIB table to further minimize the probability of error. This test does not involve actual traffic injection through data path.

At operation 3-11, VM upgrader 121 configures/marks active RP VM 230 to be a standby RP VM. At operation 3-12, VM upgrader 121 configures active LC VM 231 to be a standby LC VM. At operation 3-13, VM upgrader 121 configures standby RP VM 270 to be an active RP VM. At operation 3-14, VM upgrader 121 configures standby LC VM 281 to be an active LC VM. Thus, after operations 3-11-3-14 are performed, the active and standby VMs of virtual router 101 have swapped roles. According to one embodiment, at this point stage 3 of the VM image upgrade process is completed.

Figure 3D:
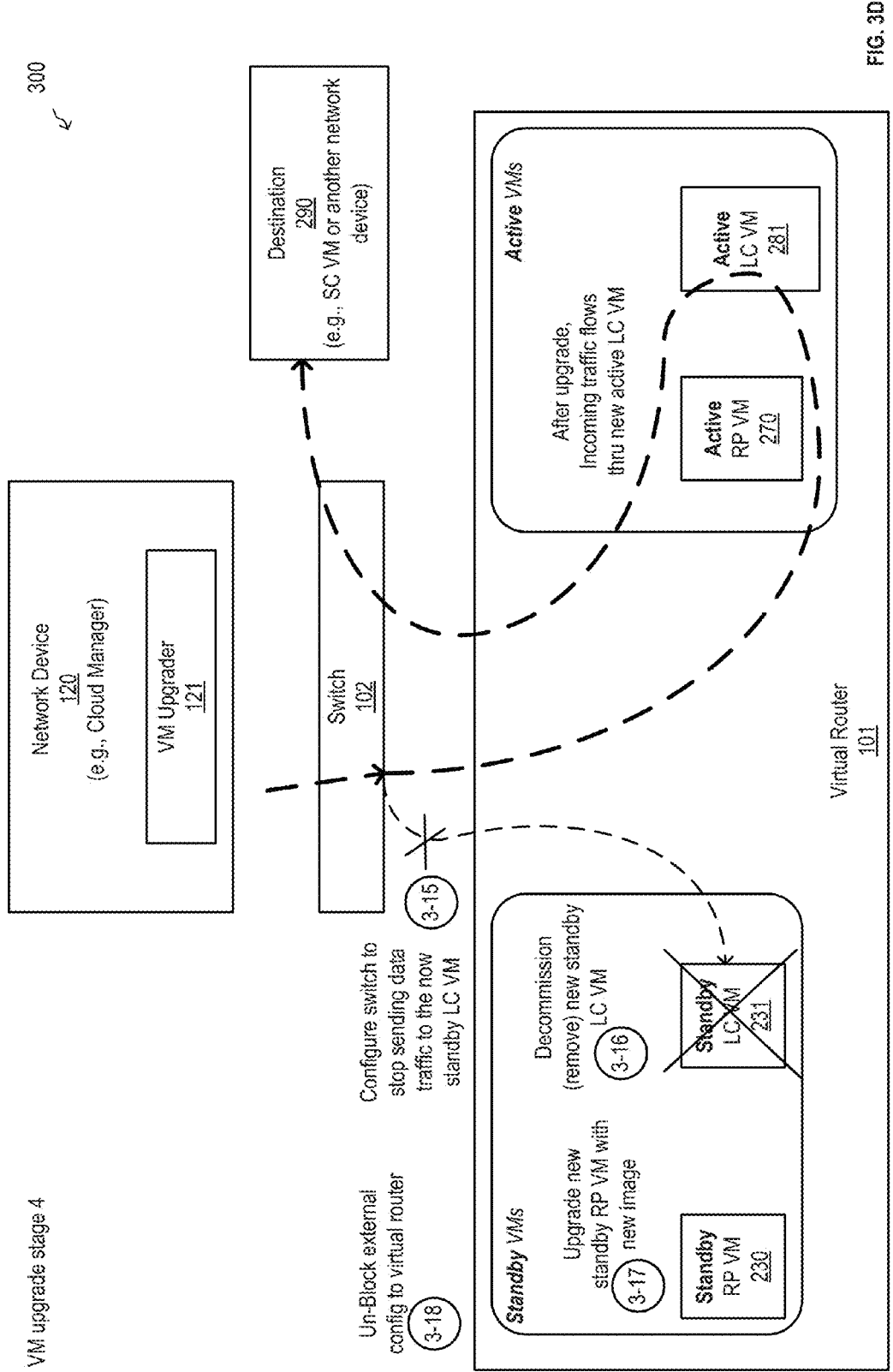
FIG. 3D is a block diagram illustrating image upgrade operations according to one embodiment.

Referring now to FIG. 3D, at operation 3-15, VM upgrader 121 configures switch 102 to stop sending data traffic to the new standby LC VM (i.e., LC VM 231). At operation 3-16 VM upgrader 121 decommissions (i.e., removes) new standby LC VM 231. At operation 3-17, VM upgrader 121 upgrades new standby RP VM 230 with the new RP VM image. Alternatively, VM upgrader 121 can decommission new standby RP VM 230, and spawn a new standby RP VM with the new RP VM image. At operation 3-18, VM upgrader 121 unblocks external configurations to virtual router 101. According to one embodiment, at this point, stage 4 of the VM image upgrade process is completed. Thus, after the upgrade operations have been completed, data traffic from switch 102 is sent to new active LC VM 281. The data traffic is then sent back out to switch 102, which forwards it to destination 290, which can be a SC VM or any network device in the network.

As described above, the upgrade process is performed in checkpointed stages. Thus, if at any stage, upgrade operations are not successful, the upgrade process will be reverted. In one embodiment, stage 1 is determined to be successful if it is determined that the standby RP VM (e.g., RP VM 270) has the new image, and all standby new LC VMs (e.g., LC VM 281) have been successfully spawned. In one embodiment, stage 2 of the VM upgrade process is determined to be successful if 1) the system states of the active and standby LC VMs are identical, 2) switch 102 is successfully configured with forwarding entries for multicasting of traffic and dropping of traffic from standby VMs to external entities.

In one embodiment, stage 3 is determined to be successful if switch 102 has successfully removed forwarding entries (from stage 2) to drop the traffic from standby VMs, and traffic test is successfully completed. In one embodiment, stage 4 is determined to be successful if switch 102 has removed forwarding entries of multicast (from stage 2).

Figure 4:
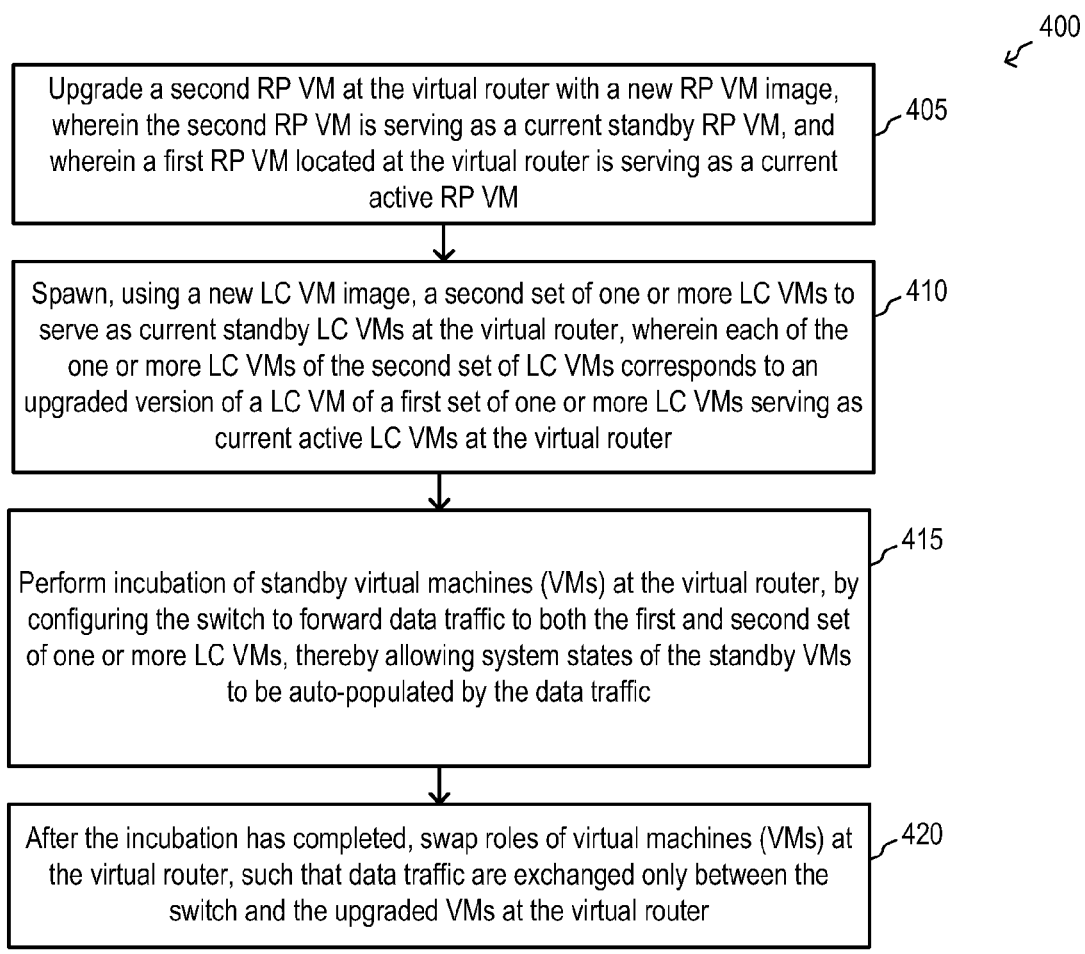
FIG. 4 is a flow diagram illustrating a method for performing image upgrade according to one embodiment.

FIG. 4 is a flow diagram illustrating method 400 for performing VM image upgrade according to one embodiment. For example, method 400 can be performed by network device 120, for example, VM upgrader 121 of network device 120, which can be implemented as software, firmware, hardware, or any combination thereof. The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference to these other diagrams can perform operations different than those discussed with reference to the flow diagrams.

Referring now to FIG. 4, at block 405, the network device upgrades a second RP VM (e.g., RP VM 270) at a virtual router (e.g., virtual router 101) with a new RP VM image, wherein the second RP VM is serving as a current standby RP VM, and wherein a first RP VM (e.g., RP VM 230) located at the virtual router is serving as a current active RP VM. For example, the operations of block 405 can be implemented as part of operations 3-01 described above.

At block 410, the network device spawns, using a new LC VM image, a second set of one or more LC VMs (e.g., LC VM 281) to serve as current standby LC VMs at the virtual router, wherein each of the one or more LC VMs of the second set of LC VMs corresponds to an upgraded version of a LC VM of a first set of one or more LC VMs (e.g., LC VM 231) serving as current active LC VMs at the virtual router. For example, the operations of block 410 can be implemented as part of operation 3-02 described above.

At block 415, the network device performs incubation of the standby VMs at the virtual router (e.g., the RP VM 270 and/or LC VM 281) by configuring a switch (e.g., switch 102) to forward data traffic to both the first and second set of one or more LC VMs, thereby allowing system states of the standby VMs to be auto-populated by the data traffic. Here, the system states that are auto-populated include the configuration states, operational states, or any combination thereof. For example, the operations of block 415 can be implemented as part of operations 3-03 through 3-08 described above.

At block 420, the network device, after the incubation has completed, swaps roles of virtual machines (VMs) at the virtual router, such that data traffic are exchanged only between the switch and the upgraded VMs at the virtual router.

According to one embodiment, a method for replicating operational state in a new upcoming router platform (e.g., virtual router 101) that is communicatively coupled to an incubatee (e.g., switch 102), includes receiving, by the new upcoming router platform, a copy of traffic forwarded by the incubatee. The method further includes the new upcoming router platform performing ingress and egress processing of the received traffic, and forwarding the processed traffic to a black-hole.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method in a first network device that is communicatively coupled to a switch and a virtual router in a network, wherein the switch sends data traffic received from the virtual router to the network, and sends data traffic received from the network to the virtual router, for performing upgrade of route processor virtual machines (RP VMs) and line card virtual machines (LC VMs) located at the virtual router without disruption to the data traffic, the method comprising:
   upgrading a second RP VM at the virtual router with a new RP VM image, wherein the second RP VM is serving as a current standby RP VM, and wherein a first RP VM located at the virtual router is serving as a current active RP VM;
   spawning, using a new LC VM image, a second set of one or more LC VMs to serve as current standby LC VMs at the virtual router, wherein each of the one or more LC VMs of the second set of LC VMs corresponds to an upgraded version of a LC VM of a first set of one or more LC VMs serving as current active LC VMs at the virtual router;
   performing incubation of standby virtual machines (VMs) at the virtual router, by configuring the switch to forward data traffic to both the first and second set of one or more LC VMs, thereby allowing system states of the standby VMs to be auto-populated by the data traffic; and
   after the incubation has completed, swapping roles between current standby RP/LC VMs and current active RP/LC VMs at the virtual router, such that data traffic are exchanged only between the switch and the upgraded LC VMs at the virtual router.

2. The method of claim 1, wherein performing incubation comprises: blocking external configurations from being made to both RP and LC VMs at the virtual router in order to prevent the VMs from changing operational states; and copying system states of the first RP VM to the second RP VM.

3. The method of claim 2, wherein performing incubation further comprises:
   configuring the switch to forward data traffic received from one or more LC VMs of the second set of LC VMs if the received data traffic is destined for a standby LC VM or a standby RP VM;
   configuring the switch to drop data traffic received from one or more LC VMs of the second set of LC VMs if the received data traffic is not destined for a standby LC VM, and not destined for a standby RP VM; and
   configuring the switch to replicate data traffic received from the network, such that the received data traffic is sent by the switch to both the first set of LC VMs and the second set of LC VMs.

4. The method of claim 2, wherein performing incubation further comprises:
   configuring the switch to forward data traffic received from one or more LC VMs of the second set of LC VMs if the received data traffic is destined for a standby LC VM or a standby RP VM;
   configuring the virtual router to drop data traffic at a server hosting the second set of LC VMs if the data traffic is not destined for a standby LC VM, and not destined for a standby RP VM; and
   configuring the switch to replicate data traffic received from the network, such that the received data traffic is sent by the switch to both the first set of LC VMs and the second set of LC VMs.

5. The method of claim 2, wherein performing incubation further comprises:
   configuring the switch to forward data traffic received from one or more LC VMs of the second set of LC VMs if the received data traffic is destined for a standby LC VM or a standby RP VM;

configuring the virtual router to drop data traffic at the second set of LC VMs if the data traffic is not destined for a standby LC VM, and not destined for a standby RP VM; and configuring the switch to replicate data traffic received from the network, such that the received data traffic is sent by the switch to both the first set of LC VMs and the second set of LC VMs.

6. The method of claim 3, wherein swapping roles between current standby RP/LC VMs and current active RP/LC VMs at the virtual router comprises configuring the switch to forward data traffic received from one or more LC VMs of the second set of LC VMs even if the received data traffic is not destined for a standby LC VM or a standby RP VM.

7. The method of claim 6, wherein swapping roles between current standby RP/LC VMs and current active RP/LC VMs at the virtual router further comprises configuring the second RP VM to serve as a new active RP VM, and configuring the first RP VM to serve as a new standby RP VM.

8. The method of claim 7, wherein swapping roles between current standby RP/LC VMs and current active RP/LC VMs at the virtual router further comprises configuring the second set of LC VMs to serve as new active LC VMs, and configuring the first set of LC VM to serve as new standby LC VMs.

9. The method of claim 8, wherein swapping roles between current standby RP/LC VMs and current active RP/LC VMs at the virtual router further comprises performing a traffic test to verify the incubation is complete.

10. The method of claim 9, wherein swapping roles between current standby RP/LC VMs and current active RP/LC VMs at the virtual router further comprises configuring the switch to stop forwarding data traffic from the network to the first set of LC VMs.

11. The method of claim 10, wherein swapping roles between current standby RP/LC VMs and current active RP/LC VMs at the virtual router further comprises removing the first set of LC VMs.

12. The method of claim 11, further comprising upgrading the first RP VM with the new RP VM image.

13. A first network device that is communicatively coupled to a switch and a virtual router in a network, wherein the switch sends data traffic received from the virtual router to the network, and sends data traffic received from the network to the virtual router, for performing upgrade of route processor virtual machines (RP VMs) and line card virtual machines (LC VMs) located at the virtual router without disruption to the data traffic, the first network device comprising:

a network interface configured to exchange messages with the network; and a virtual machine (VM) upgrader, coupled to the network interface, configured to:
 upgrade a second RP VM at the virtual router with a new RP VM image, wherein the second RP VM is serving as a current standby RP VM, and wherein a first RP VM located at the virtual router is serving as a current active RP VM,
 spawn, using a new LC VM image, a second set of one or more LC VMs to serve as current standby LC VMs at the virtual router, wherein each of the one or more LC VMs of the second set of LC VMs corresponds to an upgraded version of a LC VM of a first set of one or more LC VMs serving as current active LC VMs at the virtual router,
 perform incubation of standby virtual machines (VMs) at the virtual router, by configuring the switch to forward data traffic to both the first and second set of one or more LC VMs, thereby allowing system states of the standby VMs to be auto-populated by the data traffic, and
 after the incubation has completed, swap roles between current standby RP/LC VMs and current active RP/LC VMs at the virtual router, such that data traffic are exchanged only between the switch and the upgraded VMs at the virtual router.

14. The first network device of claim 13, wherein performing incubation comprises: blocking external configurations from being made to both RP and LC VMs at the virtual router in order to prevent the VMs from changing operational states; and copying system states of the first RP VM to the second RP VM.

15. The first network device of claim 14, wherein performing incubation further comprises:
 configuring the switch to forward data traffic received from one or more LC VMs of the second set of LC VMs if the received data traffic is destined for a standby LC VM or a standby RP VM;
 configuring the switch to drop data traffic received from one or more LC VMs of the second set of LC VMs if the received data traffic is not destined for a standby LC VM, and not destined for a standby RP VM; and
 configuring the switch to replicate data traffic received from the network, such that the received data traffic is sent by the switch to both the first set of LC VMs and the second set of LC VMs.

16. The first network device of claim 14, wherein performing incubation further comprises:
 configuring the switch to forward data traffic received from one or more LC VMs of the second set of LC VMs if the received data traffic is destined for a standby LC VM or a standby RP VM;
 configuring the virtual router to drop data traffic at a server hosting the second set of LC VMs if the data traffic is not destined for a standby LC VM, and not destined for a standby RP VM; and
 configuring the switch to replicate data traffic received from the network, such that the received data traffic is sent by the switch to both the first set of LC VMs and the second set of LC VMs.

17. The first network device of claim 14, wherein performing incubation further comprises:
 configuring the switch to forward data traffic received from one or more LC VMs of the second set of LC VMs if the received data traffic is destined for a standby LC VM or a standby RP VM;
 configuring the virtual router to drop data traffic at the second set of LC VMs if the data traffic is not destined for a standby LC VM, and not destined for a standby RP VM; and
 configuring the switch to replicate data traffic received from the network, such that the received data traffic is sent by the switch to both the first set of LC VMs and the second set of LC VMs.

18. The first network device of claim 15, wherein swapping roles between current standby RP/LC VMs and current active RP/LC VMs at the virtual router comprises configuring the switch to forward data traffic received from one or more LC VMs of the second set of LC VMs even if the received data traffic is not destined for a standby LC VM or a standby RP VM.

19. The first network device of claim 18, wherein swapping roles between current standby RP/LC VMs and current active RP/LC VMs at the virtual router further comprises configuring the second RP VM to serve as a new active RP VM, and configuring the first RP VM to serve as a new standby RP VM.

20. The first network device of claim 19, wherein swapping roles between current standby RP/LC VMs and current active RP/LC VMs at the virtual router further comprises configuring the second set of LC VMs to serve as new active LC VMs, and configuring the first set of LC VM to serve as new standby LC VMs.

21. The first network device of claim 20, wherein swapping roles between current standby RP/LC VMs and current active RP/LC VMs at the virtual router further comprises performing a traffic test to verify the incubation is complete.

22. The first network device of claim 21, wherein swapping roles between current standby RP/LC VMs and current active RP/LC VMs at the virtual router further comprises configuring the switch to stop forwarding data traffic from the network to the first set of LC VMs.

23. The first network device of claim 22, wherein swapping roles between current standby RP/LC VMs and current active RP/LC VMs at the virtual router further comprises removing the first set of LC VMs.

24. The first network device of claim 23, wherein the VM upgrader is further configured to upgrade the first RP VM with the new RP VM image.

\* \* \* \* \*